United States Patent [19]
Upham

[11] 3,818,795
[45] June 25, 1974

[54] GEAR TOOTH CHAMFERING

[75] Inventor: Robert Warren Upham, Jackson, Mich.

[73] Assignee: Clark Equipment Company, Buchanan, Mich.

[22] Filed: Aug. 25, 1972

[21] Appl. No.: 283,842

[52] U.S. Cl. .................................. 90/1.4, 90/10
[51] Int. Cl. .................................. B23f 19/10
[58] Field of Search ............ 90/1.4, 10, 8, 1.6, 7, 90/7.5

[56] References Cited
UNITED STATES PATENTS
2,035,434  3/1936  Loewus ............................. 90/10
2,343,407  3/1944  Galloway .......................... 90/1.4
3,605,550  9/1971  Blything ............................ 90/7
3,651,738  3/1972  Bregi ................................. 90/10

FOREIGN PATENTS OR APPLICATIONS
1,047,578  3/1956  Germany ......................... 90/1.4

Primary Examiner—Gil Weidenfeld
Attorney, Agent, or Firm—Paul H. Gallagher

[57] ABSTRACT

A machine for chamfering the ends of gear teeth, chamfering all of the teeth simultaneously in one direction. The machine includes two cutters, one for each direction of taper of the chamfer, i.e., a right hand and a left hand cutter. The chamfering is performed by moving the cutter toward the gear simultaneously axially and angularly, for producing the desired angle of chamfer, and adjustments can be made for varying that angle.

12 Claims, 9 Drawing Figures

PATENTED JUN 25 1974

GEAR TOOTH CHAMFERING

PUBLISHED ART

Attention is directed to U.S. Pat. No. 2,343,407, Galloway, issued Mar. 7, 1944.

OBJECTS OF THE INVENTION

A broad object of the invention is to provide a novel machine for chamfering the ends of gear teeth.

Another broad object is to provide a novel machine of the character just referred to, utilizing a cutter for chamfering all of the teeth of a gear simultaneously, in one direction, and in another operation chamfering all of those teeth in the other direction, wherein the two directions represent the opposite tapered or chamfered surfaces.

Still another object is to provide a machine for chamfering teeth of the foregoing character, wherein the angle of chamfer can be adjusted, while utilizing the same cutters for different angles of chamfer.

Still another object is to provide a machine for chamfering gear teeth wherein because it produces a cutting operation on all of the teeth of a gear simultaneously, the operation eliminates cocking and binding of the gear in the cutting operation.

A still further object is to provide a gear chamfering machine which is extremely simple in construction, particularly because only a single cutter is utilized for a gear, for each direction of tapered surface of the chamfer.

A still further object is to provide a gear chamfering machine of the foregoing character, of novel construction and operation, particularly effective because of reciprocating and oscillating movements of the cutters, and of feeding the gear toward the cutters.

Another object is to provide a novel method of chamfering gear teeth.

Still another object is to provide a product according to the foregoing method.

DESCRIPTION OF A PREFERRED EMBODIMENT:

Figure 1:
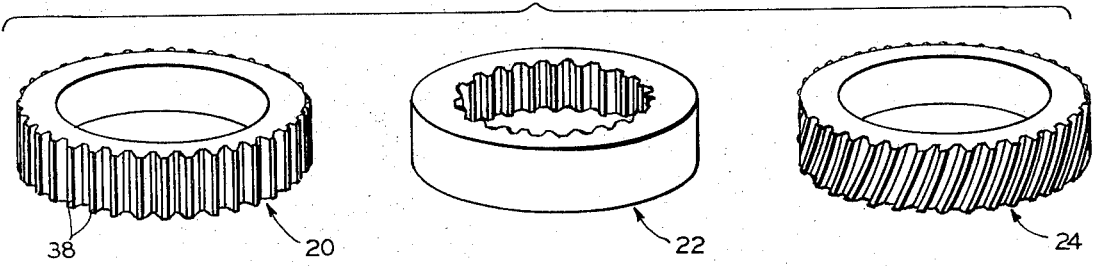
FIG. 1 illustrates three representative kinds of gears which can be chamfered by the machine and method of the present invention.

Referring in detail to the accompanying drawings, attention is directed first to FIG. 1 showing three gears 20, 22, 24 as representative of various kinds of gears that can be chamfered by the machine of the present invention. Gear 20 is a spur gear with external teeth, gear 22 has internal teeth, and gear 24 helical teeth. For purposes of simplicity, a spur gear such as 20 is represented in the later figures of the drawing although it will be understood that the operation is identical regardless of the kind of gear.

At least certain of the components or elements of the machine are duplicated, and identical or nearly so, except that they are designed for movements in opposite directions or for performing functions in opposite senses, such as left hand (LH) and right hand (RH). These components or elements will also be identified respectively with the postscripts $a$ and $b$ without further explanation of the use of these designations.

Figure 2:
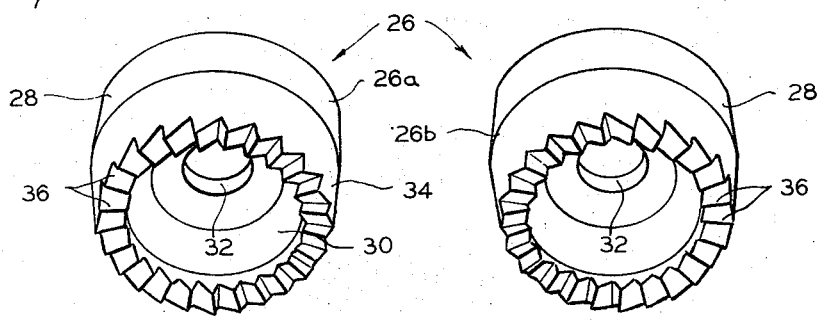
FIG. 2 illustrates the two different cutters, a left hand cutter and a right hand cutter, utilized in producing the opposite tapered surfaces of the chamfered formation.

FIG. 2 shows the two cutters 26 utilized in the machine, a left hand cutter 26$a$ and a right hand cutter 26$b$. These cutters are identical except for the direction of the cutting teeth thereon as referred to again hereinbelow. Each cutter includes a cylindrical wall 28 and an end wall 30 with an aperture 32 therein for mounting the cutter in the machine in a known manner. Leading downwardly from the cylindrical wall 28 is a conical wall 34 on which the cutting teeth 36 are formed. These cutting teeth lie in an annulus concentric with the axis of the cutter, and have a radial dimension similar to the corresponding dimension of the teeth to be chamfered, so that the chamfered surfaces on the gear teeth extend the full radial dimension of the teeth on the cutter. In other words the chamfered or tapered surfaces on the gear teeth are formed throughout their radial extent in a given cutting motion of the cutter, although the full tapered surfaces are performed by a series of such cutting movements.

Figure 3:
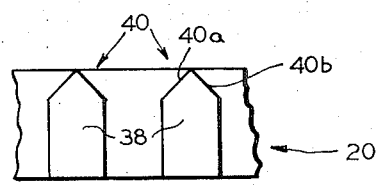
FIG. 3 is a fragmentary view of a portion of a gear and showing the desired chamfered end surfaces of the teeth.

Reference is next made to FIG. 3 showing a fragment of a spur gear 20 having teeth 38 extending straight in axial direction. The teeth 38 have chamfered surfaces 40, each tooth having opposed tapered surfaces or ramps, 40$a$ and 40$b$.

Figure 4:
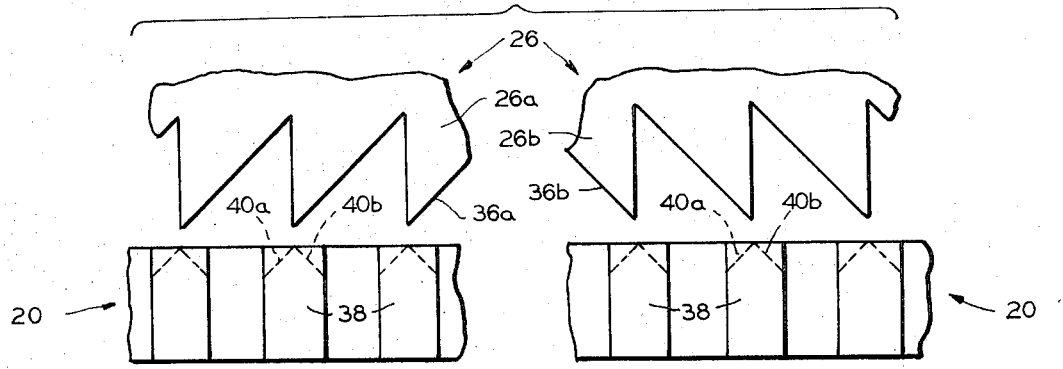
FIG. 4 is a large scale fragmentary view of the two cutters used in the machine, a left hand cutter and a right hand cutter, and teeth to be chamfered thereby.

FIG. 4 shows fragments of two cutters 26, namely 26$a$ or left hand cutter and 26$b$ or right hand cutter. The relationship in this figure shows the cutting teeth 36$a$ in position for forming chamfer surfaces 40$a$, while the cutting teeth 36$b$ on the other cutter are in position for forming chamfer surfaces 40$b$. This relationship will be referred to again hereinbelow.

Figure 5:
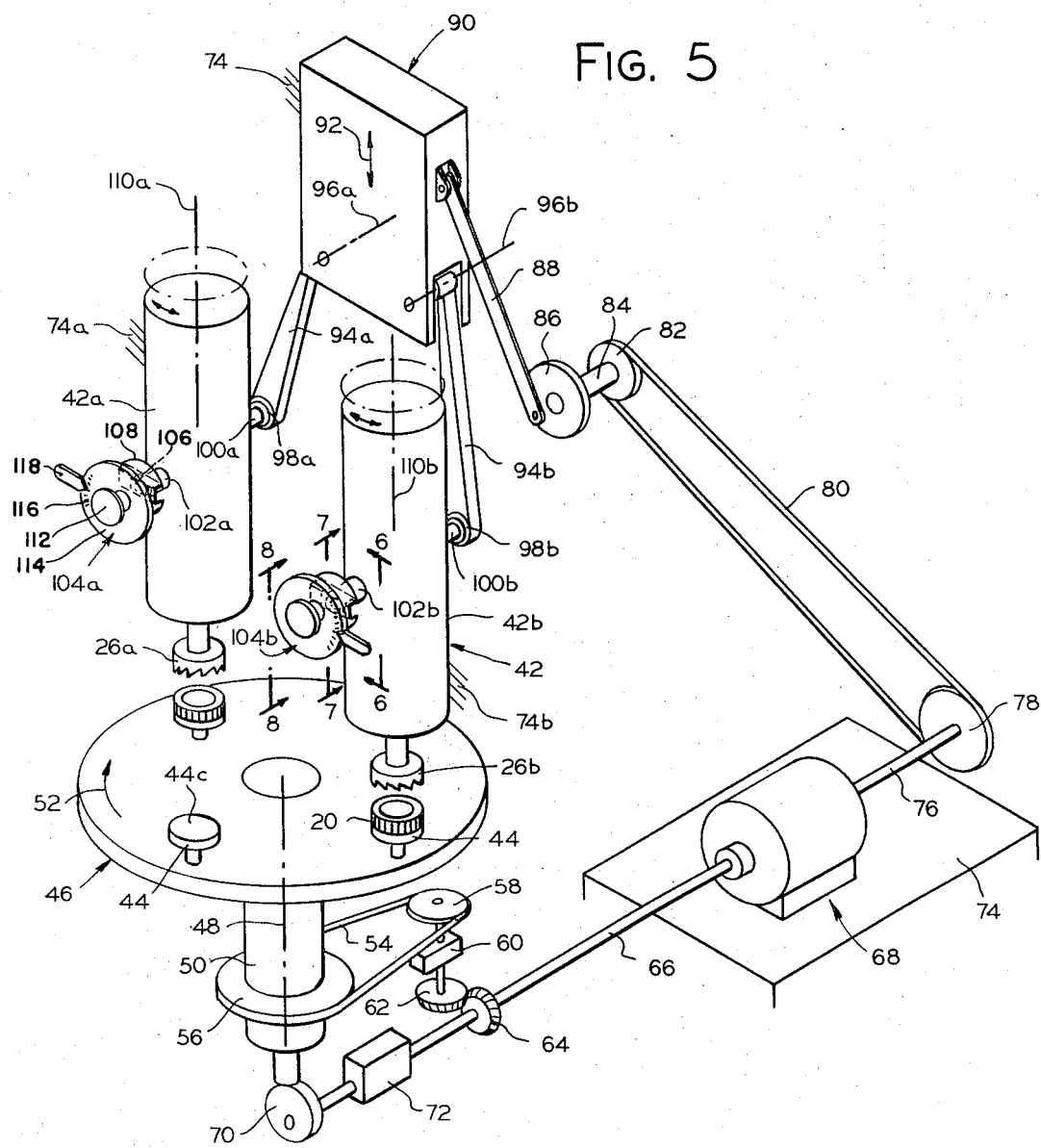
FIG. 5 is a perspective view, largely schematic in nature, of the principal components of the machine embodying the present invention.

Attention is now directed to FIG. 5, which is highly schematic, showing the principal components or elements of the chamfering machine made according to the present invention. The two cutters or cutting tools 26 are mounted on the lower ends of cutter rams 42 in association with gears 20 mounted on gear supports 44. In the present instance three such gear supports are provided, being on an index table 46. The arrangement is such that the gears 20 are on two of the gear supports at a time, for having the chamfering operation performed thereon, while a third one (44$c$) is exposed to the operator for loading and unloading.

The index table 46 is mounted for rotation on a vertical axis 48, in a suitable support 50 for rotation in a desired direction such as clockwise as indicated by the arrow 52. The index table is rotated through a belt 54 trained on a pulley 56 on the support 50 and on another pulley 58 serving as an output element of an indexing means 60 of known kind which includes gear reduction drive means, and means for driving the indexing table 46 in indexing operations for aligning the gears 20 with the cutters 26 periodically, for the chamfering operations. Details of this indexing means 60 need not be entered into since it does not as such enter into the invention.

The input to the indexing means 60 includes a miter gear 62 in mesh with another miter gear 64 on a drive shaft 66 driven by the common drive means 68 of the machine. This drive means may for example be an electric motor or other suitable device.

The indexing table 46 is also arranged for vertical movement for advancing the gears 20 upwardly into operative association with the cutters 26. The means for mounting the indexing table for vertical movement may be as desired and included in the support 50. Such movement is produced directly by a cam 70 engaging the lower end of the support means 50 of the table, this cam being driven by the drive shaft 66 through a component 72 of known kind, operative for rotating the cam 70 at the desired rate, and periodically according to the chamfering operations being performed. This movement will be referred to again hereinbelow.

FIG. 5 shows an element 74 representing a frame which supports the motor 68, but this representation indicates the complete frame of the machine on which all of the other components and elements are mounted, such mounting arrangement being of known kind and therefore details of construction thereof may be omitted.

The drive motor 68 serving the common drive means for the whole machine, as indicated above, includes another output shaft or drive shaft 76 on which is a pulley 78 which, acting through a belt 80, drives another pulley 82 on a shaft 84 on which is a crank 86. Connected to the crank 86 is a link or pitman 88 which is also connected to a crank slide 90 mounted in the frame 74 for vertical reciprocating movements, as indicated by the arrow 92. The crank slide 90 is fixed against movement in other directions.

Mounted in the crank slide 90 are a pair of links 94a, 94b pivoted on parallel axes 96a, 96b and having their outer and lower ends connected in ball and socket joints 98a, 98b which also are mounted on radial stub shafts or arms 100a, 100b fixed to and extending radially from the cutter rams 42. Extending from the opposite sides, diametrically, of the cutter rams 42 are radial stub shafts or arms 102a, 102b which if desired may be extensions of the stub shafts 100.

Figure 6:
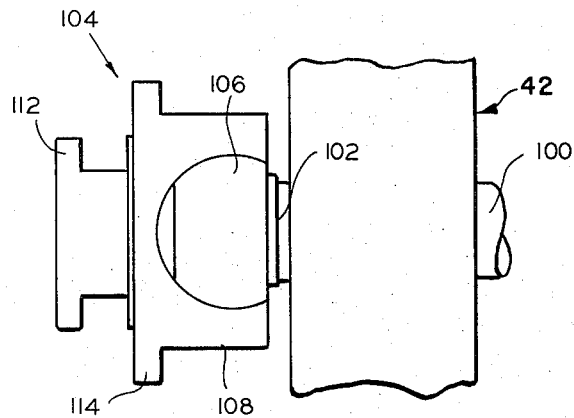
FIG. 6 is a fragmentary side view of only certain of the components of FIG. 5, taken as represented approximately at line 6—6 of FIG. 5.
Figure 7:
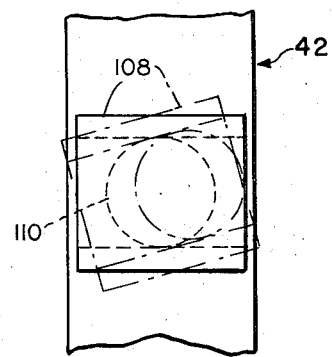
FIG. 7 is a fragmentary view of a portion of FIG. 5 as indicated by the line 7—7 of FIG. 5.
Figure 8:
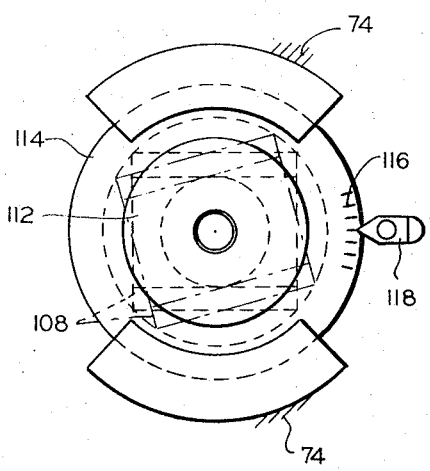
FIG. 8 is a detail view taken at line 8—8 of FIG. 5.

Operatively associated with the latter stub shafts, 102, are cam units 104a, 104b, which are identical in construction, or nearly so, but which may be arranged symmetrically oppositely. Each of the units 104, as best shown in FIGS. 6–8, includes the shaft 102, identified above, having at its outer end a working element 106 which may be in the form of a roller riding in a channel element 108 extending adjacent the horizontal but movable to different angular position relative to the horizontal, for controlling the depth and angle of the chamfering operation. This channel 108, as indicated, is mounted for angular movement about an axis 110 (FIG. 7) which is not necessarily coincident with the axis of the roller 106 because the roller moves longitudinally of the channel. The angular movements of the channel about its axis is indicated by the solid and dot-dash lines of FIG. 7, these different positions of the channel being the result of pre-set adjustments made by the operator, who can manually manipulate the knob 112 mounted on a disc or plate 114 secured to the channel. Upon rotational or angular adjustment of the knob 112 and disc 114, the channel 108 is positioned in any of various angular positions as indicated in FIG. 7. The disc 114 includes dial markings 116 cooperating with an index pointer 118 mounted on the frame of the machine for indicating the predetermined angular adjustment of the channel 108.

The rollers 106 provide a degree of universal movement in the channels in the reciprocating and oscillating movements of the cutter rams 42. The links 94 serve to both rotate the cutter rams and reciprocate them in a manner described hereinbelow. These cutter rams are mounted in the frame 74 as indicated by the elements 74a, 74b which permit such movements of the rams but confine them against other movements. The central axes of the rams are indicated at 110a, 110b.

A principal function of the chamfering operation includes vertical reciprocation of the crank slide 90. FIG. 5 shows this crank slide at an intermediate position, in which the cutters 26 are elevated from the gears 20, although not necessarily depicted in proportional spacing. In response to raising the crank slide 90, the lower ends of the links 94 are raised and this draws upwardly on the cutter rams 42, and the lower ends of the links 94 tend to move inwardly toward each other, particularly in view of resistance encountered in the units 104; the result is that the cutter rams 42 are both raised and oscillated, the oscillation or rotation of the rams being opposite, 42a being rotated clockwise and the cutter ram 42b being rotated counterclockwise.

The cams or channels 108 provide a resistance to the axial movement of the cutter rams, but they enable the shafts 102 to be displaced longitudinally therealong, and depending upon the angle of those channels, the cutter rams are raised axially a corresponding extent. The outer ends of the shafts 102 being fulcrumed in the channels, upon raising the shafts 100, the latter act on the cutter rams and raise them. The channels 108 are in fixed position in any given chamfering operation, although they are adjustable as referred to.

When the crank slide 90 is lowered, the movements just described are reversed, resulting in the cutter rams 42 being lowered and oscillated, and in this movement a chamfering step is performed on the gears 20. For convenience, it is pointed out that as the crank slide 90 is lowered, the links 94 are moved or pushed outwardly away from each other, rotating or oscillating the cutter rams in the opposite directions, i.e., opposite the movements referred to above in the raising step; also, the outer ends of the links 94 are lowered, this movement lowering the stub shafts 100 and because the stub shafts 102 are fulcrumed in the channels 108, the cutter rams are lowered. Thus as the cutter rams are lowered, the chamfering step is performed as represented in FIG. 4, i.e., the left hand cutter 26a is moved downwardly and in clockwise direction resulting in the cutter teeth 36a cutting the gear teeth in the direction of the tapered surface 40a. A similar but opposite movement takes place in connection with the other cutter ram 42b, that is, the cutter teeth 36b thereon move in the direction for cutting the tapered surface 40b. The full chamfering operation is performed by a plurality of such steps or reciprocations, as referred to again hereinbelow.

Figure 9:
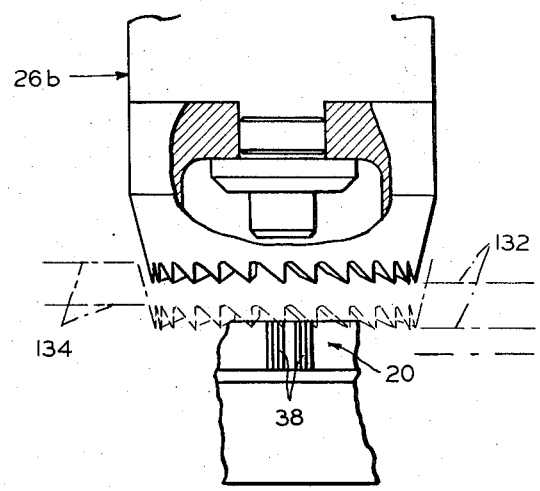
FIG. 9 is a fragmentary large scale view of a cutter as represented in FIG. 5 and showing special relation to the gear of which the teeth are being chamfered.

During the reciprocating movements of the cutter rams, the indexing table 46 is moved upwardly through the elevating cam 70 and the drive thereto, a predetermined distance, and throughout a predetermined period of time, for the cutters to perform their chamfering operation. The range of this relative movement is represented in FIG. 9 where the amount of elevation of the indexing table, and thus of the gears 20, is represented by the space between the dot-dash lines 132. The range of reciprocation of the cutter rams, and thus the cutters 26, is represented by the spacing between the dot-dash lines 134, both of these indicated ranges being highly exaggerated in this figure.

The machine is operated at a suitable rate, such for example as 250 strokes per minute. The chamfering operation is completed in approximately 60 strokes, thus requiring less than ¼ minute for performing a chamfering operation in one direction.

After the chamfering operation is completed in one direction, such for example as the left hand operation (FIG. 5), the cutter is raised out of cutting position and the indexing table 46 rotated for advancing the gear supports 44 to the next position and that same gear will have a right hand chamfering operation performed thereon. Thus a gear is completed in two periods of less than ¼ minute each, plus the time required for indexing the table.

The stroke of the cutter rams is in the neighborhood of ½ inch, this depending on the angle of chamfer, where as referred to above, the angle of adjustment of the cam tracks will determine the range of vertical reciprocation of the cutter rams. The feed of the gear 20 as represented in FIG. 9, is in the neighborhood of ⅛ of an inch, this feed being of course constant regardless of kind of gear being chamfered, as determined by the elevating cam 70 (bottom of FIG. 5).

The adjustability of the channels or cams 108 enables predetermined setting of the angle at which the teeth are chamfered. As the crank slide 90 is reciprocated, and the transverse distance between the lower ends of the links 94 is effectively altered, the cutter rams 42 are oscillated about their axes 110; since the cutter rams are retained about those same axes, the outer ends of the levers 102 move along the channels 108 and since the channels are fixed in position at any given setting, the outer ends of the levers 102 riding along the channels produces the reciprocation of the cutter rams vertically; thus depending upon the inclination of the channels, the outer ends of the levers 102 will move a greater or lesser degree in vertical direction, resulting in corresponding vertical movement of the cutter rams. The rotational or oscillatory movement of the rams is substantially the same, or at least it varies within only a very slight range, and the result is that at every rotational movement of the cutter rams throughout a substantially constant angular extent, and the greater or lesser vertical reciprocation of the rams, the cutters 26 proceed at a different angle to form the chamfered surfaces 40. The channels can be adjusted so as to provide variation in the angle of the chamfered surfaces between 0° and 45°. Thus for any given gear and corresponding cutter, the angle of chamfer can be as desired within the range mentioned without making any change other than the adjustment of the channels; that is to say, there need not be separate cutters for different angles for chamfering any given gear.

The manually adjustable cam units 104 are preferably individually set, as here disclosed, so as to more accurately control the angle of each chamfered surface, and it has the further advantage that the two chamfered surfaces need not be at the same angle, as may be at times desired, such for example as in the case of helical teeth.

A single pair of cutters 26a, 26b need only be provided for each kind of gear, depending on the size of the gear, the spacing of the teeth thereon, and other dimensions characteristic of the particular gear. The teeth 36 on the cutters may be the same shape and it is not necessary to provide cutters with different kinds or shape of teeth in order to provide different angles of chamfer on the gear teeth.

The chamfering operation is extremely effective, the chamfered surfaces on all of the gear teeth (either right or left) are uniform, and this is an advantage over previously known devices in which the teeth are chamfered individually. Additionally, because of the simultaneous chamfering of all the teeth on the gear, all tendency to binding or cocking of the gear is eliminated. Another great advantage is the small amount of time required for simultaneously chamfering the teeth as compared with chamfering the teeth individually as heretofore.

I claim:

1. Chamfering mechanism including a frame and comprising, an indexing table, means for indexingly advancing the table to predetermined positions, gear supports on the table distributed angularly therearound for supporting gears having teeth to be chamfered, cutter rams above the table on vertical axes and vertically aligned with two of the gear supports when the table is in each of said positions, a cutter on the lower end of each of the cutter rams, means mounting the cutter rams for vertical reciprocation and for oscillation, a radial arm mounted on each cutter ram, a cam unit associated with an outer end of each of said arms, each arm being fulcrumed at an outer end thereof in the corresponding cam unit, and actuating means connected to the inner ends of the arms and, acting through the arms, operative for simultaneously reciprocating and oscillating the cutter rams, the cutters, in response to downward movement of the cutter rams, engaging gears on the gear supports and thereby operative for producing a chamfering cut on the teeth of the gears.

2. Chamfering mechanism according to claim 1, wherein, the actuating means include a crank slide reciprocable on a vertical axis parallel with the axes of the cutter rams, and links pivotally interconnected between the crank slide and the cutter rams.

3. Chamfering mechanism according to claim 2, wherein, the axes of the cutter rams are fixed, the cutter rams are reciprocated and oscillated in response to shortening of the effective length of said links in direction transverse between the crank slide and the cutter rams, the cam units lie in a direction having at least a component of horizontal extension, the outer ends of said arms move angularly in the cam units in the oscillating movements of the cutter rams, and the cam units are adjustable for varying the inclination thereof for thereby varying the vertical throw of the cutter rams in the reciprocating movements of the latter.

4. Chamfering mechanism according to claim 3, wherein, each cam unit includes vertically spaced cam elements, each said arm has a roller at its outer end received in and operating between the cam elements of the corresponding cam unit, the cam units are pivotally supported, and a manually settable elevating element operatively engages the end of each cam unit for controlling the vertical adjusting movements of the cam elements.

5. Chamfering mechanism according to claim 1 and including, means for raising the indexing table in each of its said indexed positions.

6. Means for chamfering the ends of teeth on gears, in which the teeth have at least a component of axial entension and the ends lie in an annulus, comprising, means for mounting a pair of gears on spaced parallel axes, a pair of cutters and means mounting them on axes spaced according to the spacing of the axes of the gears, and for reciprocation along and oscillation about their own axes, the means for mounting the cutters being operative for confining them against movement except in axial reciprocating and circumferential oscillating directions, common actuating means for moving the cutters including a crank slide reciprocable on an axis parallel with the axes of the gears and cutters, and means operatively interconnecting the crank slide and the cutters, and means cooperating with said interconnecting means in response to reciprocation of the crank slide to cause the cutters to reciprocate and to oscillate in opposite directions for performing cutting operations on the gear teeth.

7. Chamfering means according to claim 6 wherein the means for mounting the cutters include cutter rams having radial arms and the crank slide has links connected to one end of the radial arms at locations eccentric to axes of the cutter rams, and the other ends of the radial arms being operatively associated with said cooperating means, to provide reciprocation and oscillation of the cutter rams and thereby the cutters.

8. Chamfering means according to claim 7 and including means for advancing the gears against the cutters in axial direction for progress in cutting along axial direction.

9. Chamfering means according to claim 8 wherein the cooperating means associated with the other ends of the radial arms are adjustable whereby to vary the angle of oscillation.

10. Chamfering means according to claim 9 wherein the last named means are individually adjustable whereby to control the angle of the chamfering on opposite sides of the teeth.

11. Means for chamfering the ends of teeth on gears, in which the teeth have at least a component of axial extension and the ends of the teeth lie in an annulus, comprising, means for mounting a pair of gears on spaced parallel axes, a pair of cutters and means mounting them on axes spaced according to the spacing of the axes of the gears, and for reciprocation along and oscillation about their own axes, common means for simultaneously actuating the cutters, means cooperating with said common means for causing said cutters to reciprocate axially and to oscillate in mutually opposite directions for chamfering the ends of the teeth upon actuation of said common means, and said cooperating means including means for adjusting the extent of axial reciprocation and degree of angular oscillation of the cutters, and said adjusting means being displaced radially from the axes of the cutters whereby to enable such adjustments independently of the mounting of the cutters.

12. Chamfering means according to claim 11 wherein the adjusting means includes members operatively associated with the respective cutters whereby to enable adjustment of each cutter independently of the other.

* * * * *